United States Patent [19]

Othen et al.

[11] 3,864,912

[45] Feb. 11, 1975

[54] CONTROL APPARATUS FOR HYDRAULIC TRANSMISSION SYSTEM

[75] Inventors: Sidney Arthur Othen, St. Helens; John Morris, Halsall near Ormskirk, both of England

[73] Assignee: Joseph Lucas (Industries) Limited, Birmingham, England

[22] Filed: June 18, 1973

[21] Appl. No.: 370,699

[52] U.S. Cl. ........................ 60/431, 60/445, 60/449
[51] Int. Cl. ............................................. F16h 39/46
[58] Field of Search ............. 60/391, 445, 446, 447, 60/488, 431, 449

[56] References Cited
UNITED STATES PATENTS

| 2,142,500 | 1/1939 | Douglas | 60/446 |
|---|---|---|---|
| 2,368,017 | 1/1945 | Grad | 60/446 |
| 3,477,255 | 11/1969 | Cryder et al. | 60/447 |
| 3,672,161 | 6/1972 | Krusche et al. | 60/445 |
| 3,684,071 | 8/1972 | Wheymann | 60/445 |
| 3,783,611 | 1/1974 | Bojas | 60/445 |

*Primary Examiner*—Edgar W. Geoghegan
*Assistant Examiner*—Wm. F. Woods
*Attorney, Agent, or Firm*—Holman & Stern

[57] ABSTRACT

This invention is concerned with a control apparatus for a hydraulic transmission system in which the transmission ratio is varied by varying the ratio of pump and motor displacements, the pump being driven by an engine fitted with a fuel control arrangement regulated by a throttle lever and by engine speed.

The control apparatus includes a crank for limiting movement of a control lever for changing the transmission ratio. The crank is movable by a piston in a combined piston and valve unit. One side of the piston is subjected to pressure from a boost pump in the transmission circuit and the other side of the piston communicates with an exhaust port through the intermediary of the valve unit. The valve unit includes a ball acted upon by a diaphragm which is disposed in a chamber having a passage on the opposite side of the diaphragm to the ball, said passage being a tapping of a line from the fuel control arrangement. The signal in the line is dependent upon engine speed and the throttle setting and gives an indication of the load on the engine.

10 Claims, 3 Drawing Figures

CONTROL APPARATUS FOR HYDRAULIC TRANSMISSION SYSTEM

This invention relates to a control apparatus for a hydraulic transmission system of the type having a fluid pump hydraulically connected to a fluid motor and in which the transmission ratio is variable by varying the ratio of the displacements of the pump and motor, the said pump being driven in use by an engine with which is associated a fuel control arrangement regulated by a signal pressure dependent on a throttle lever position and on the engine speed.

BRIEF SUMMARY OF THE INVENTION

A control apparatus for a hydraulic transmission of the type referred to comprises control means for varying the ratio of the transmission system, an adjustable stop for limiting the movement of the control means, an actuating means for the said stop and responsive to a control signal and a means sensitive to the said signal pressure for providing the said control signal for the actuating means, the arrangement being such that at a predetermined value of the said signal pressure the actuating means moves the said stop so as to cause the control means to reduce the said transmission ratio.

DETAILED DESCRIPTION OF DRAWINGS

Figure 1:
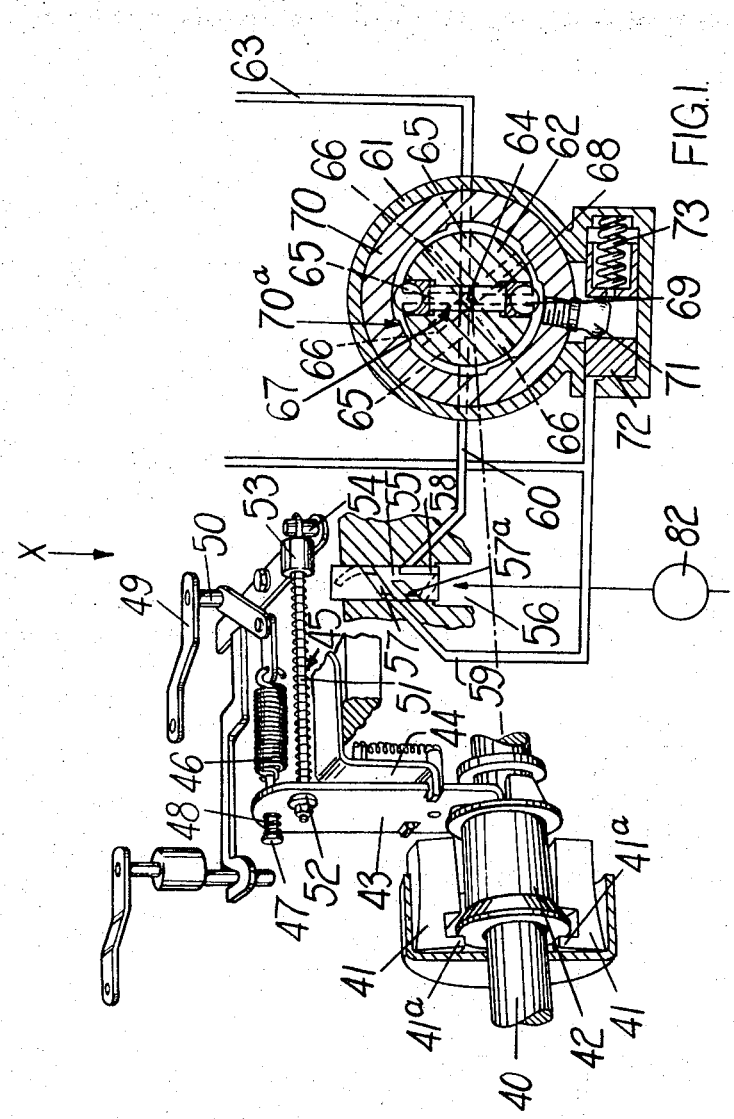
FIG. 1 shows, somewhat diagrammatically, a fuel pump arrangement.

The pump arrangement shown in FIG. 1 has a shaft 40 driven by an engine which is supplied, in use, with fuel by the said pump arrangement. The shaft 40 carries a pair of pivotally mounted weights 41, each of which includes a projection 41a engaging a sleeve 42 axially slidable on the shaft 40. A lever 43 is pivotally mounted on a bracket 44 and at one end engages the sleeve 42. The other end of the lever 43 is acted upon by an initially loaded compression spring 45 and by a tension spring 46. The spring 46 in fact acts on the lever 43 via a spindle 47 and a light compression spring 48. The end of the spring 46, remote from the lever 43, engages a bell crank 49 rotatable about a pivot 50 by the throttle lever (not shown) for the engine. The spring 45 is supported by a rod 51 one end of which passes slidably through the lever 43 and includes a flange 52 engageable with the lever 43. The end of the rod 51, remote from the lever 43, is formed with an abutment 53 for the spring 45 and engages the end of a crank arm 54.

A metering valve 55 is rotatable in a bore 56 and forms a pivot for the crank arm 54. The valve 55 is formed with a pair of helical grooves 57, 57a and with a longitudinal groove 58. A passage 59 opens into the wall of the bore 56 and communicates, in use, either with groove 57 or groove 57a. The land between the grooves 57, 57a is, in fact, dimensioned so that the passage 59 may communicate with grooves 57, 57a simultaneously over a range of angular positions of the valve 55. A passage 60 opens into the bore 56 and communicates with the longitudinal groove 58, whereby the groove 58 provides a metering orifice whose size depends on the angular position of the valve 55.

A pump body 61 surrounds a rotor 62 coupled to the shaft 40. The rotor 62 forms part of a vane-type low pressure pump 82 from which fuel is supplied to the bore 56 and thence to the passage 60. The rotor 62 also forms part of an injector pump of which passage 60 forms the inlet and a passage 63 forms the outlet, the passage 63 being axially displaced from the passage 60. The rotor 62 is formed with an axial bore 64.

A plurality of radial passages 65 extend from the bore 64 so as, in use, successively to communicate with the passage 60. A plurality of radial passages 66 also extend from the bore 64 and, in use, communicate successively with the passage 63. The rotor 62 has a transverse bore 67 which communicates with the axial bore 64 and in which a pair of plungers 68 are slidable. The plungers 68 support rollers 69 which in turn engage an annular cam 70 having a plurality of diametrically opposed inwardly directed lobes 70a. The cam 70 is rotatable relative to the pump body 61 and includes a projection 71 which is engaged in a piston 72 which is slidable in the pump body 61. The piston 72 is biased by a spring 73 against pressure exerted by fuel in passage 59.

In use, the shaft 40 causes the rotor 62 to move clockwise and fuel to be delivered by the low pressure pump to the bore 56. The angular position of the metering valve 55 is dependent on the position of the lever 43 which is in turn dependent on the speed of the shaft 40 and on the setting of the engine throttle. If the engine speed is less than that which should correspond to a given throttle setting, the force exerted by the spring 46 will overcome that exerted on the sleeve 42 by weights 41. The resulting movement of the lever 43 will be transmitted by the spring 45 so as to rotate the metering valve 55 anti-clockwise as viewed in the direction of arrow X. When the fuel is being delivered by the pump, the valve 55 is free to rotate under the influence of lever 43. In this condition there is therefore no relative movement between lever 43 and rod 51, and spring 45 is not compressed from its initial pre-loaded length. The said anti-clockwise rotation causes the metering orifice provided by the longitudinal groove 58 to increase the flow of fuel through passage 60. When one of the passages 65 is in communication with the passage 60, fuel flows into the bore 64. The rollers 69 are at this time between the lobes 70a and the plungers 68 therefore move apart. Subsequent rotation of the rotor 62 isolates passage 60 from the bore 64 and the plungers 68 are forced inwards by engagement of the rollers with lobes 70a. At the same time a passage 66 communicates with the passage 63 and fuel is discharged under pressure to the engine via passage 63. In this condition the passage 59 communicates via groove 57 with a low pressure dump. The cam 70 is therefore urged by the spring 73 to a fully clockwise position relative to the pump body 61.

In light-load conditions the engine speed exceeds that appropriate to the throttle setting. The spring 46 is extended by the action of the weights 41 and the lever 43 engages the flange 52 on the rod 51 to rotate the valve 55 clockwise as viewed on arrow X. A reduced amount of fuel is supplied to the passage 60 and is thus transferred by the plungers 68 to the passage 63. The plungers 68 thus move outwards by a lesser amount on each stroke. Since the lobes 70a have ramp-like leading edges, the rollers 69 will engage the lobes 70a at slightly later points in the rotation of the rotor 62. This would result in retardation of the injection of fuel. In this condition, therefore, the passage 59 communicates with the bore 56 via the groove 57a, and the piston 71 is urged against the spring 73 to rotate the cam 70 anti-clockwise relative to the pump body 61. The resulting advance of the injection of fuel rectifies the retardation resulting from reduced fuel flow. This arrangement is commonly referred to as "light-load advance."

The signal pressure appearing in passage 59 is thus dependent on engine speed and throttle setting and is indicative of the load on the engine. The said signal pressure may be intermediate the pressure in the bore 56 and the dump pressure when the groove 57, 57a are both in communication with passage 59.

Figure 2:
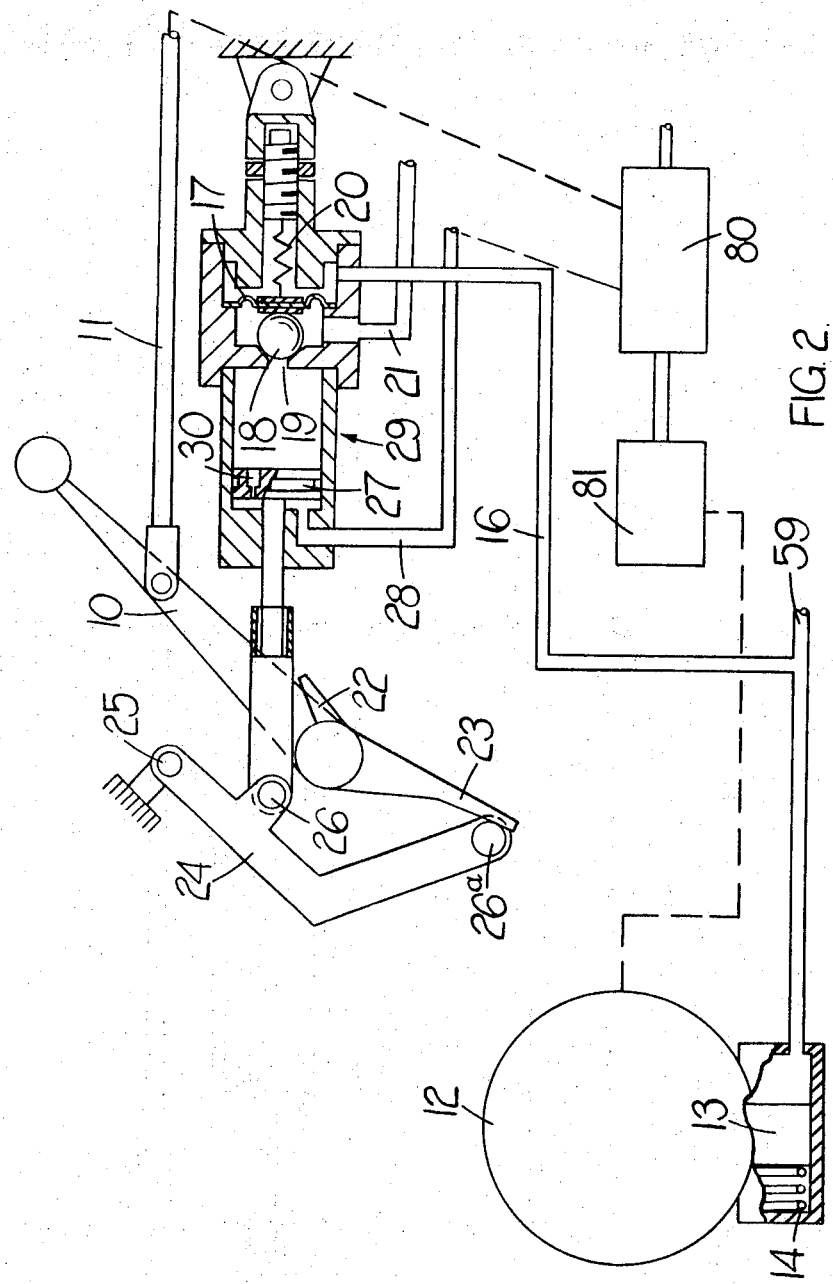
FIGS. 2 and 3 are diagrams of alternative examples of control apparatus according to the invention.

The apparatus shown in FIG. 2 has a control means in the form of a lever 10 which varies the ratio, from forward through neutral to reverse, of a hydraulic transmission system 80 via a link 11. The hydraulic transmission system is associated with a diesel engine 81 which is supplied with fuel by a pump arrangement 12 substantially as described with reference to FIG. 1 including a piston 13 biassed by a spring 14, the piston 13 and spring 14 being equivalent of piston 72 and spring 73 described with reference to FIG. 1.

A tapping 16 from the passage 59 enables the signal pressure therein to be applied to one side of a diaphragm 17. The diaphragm 17 forms part of a combined piston and valve unit 29. The diaphragm 17 coacts with a ball 18 which forms a closure member for a port 19 on a side of the diaphragm 17 remote from a tapping 16. A tension spring 20 biases the diaphragm 17 against the pressure in the tapping 16, in a direction to allow the port 19 to communicate with an exhaust port 21. The lever 10 has formed thereon two abutments 22, 23. A crank 24 is rotatable about a pivot 25 and carries a pair of rollers 26, 26a which are respectively engageable with the projections 22, 23. The crank 24 is movable by means of a piston 27. A line 28 supplies a fluid pressure obtained from a boost pump, forming part of the transmission system 80, to one side of the piston 27. The other side of the piston 27 communicates with the port 19. A flow restrictor 30 interconnects the sides of the piston 27.

In use the signal pressure in line 16 reduces with increasing load on the engine. So long as the said signal pressure is sufficiently high as to maintain the port 19 shut, the pressures on both sides of the piston 27 will be equal. The difference in the areas on opposite sides of the piston 27 urges the crank 24 in a clockwise direction as shown in the drawing. The lever 10 may thus be moved over the full extent of its travel and the ratio of the transmission thereby controlled up to its maximum value in either a forward or reverse direction. When the pressure in line 16 falls to a level which is indicative of an approach to engine stall, the spring 20 moves the diaphragm 17 to allow ball 18 to lift, and fluid flows from line 28 via restrictor 30 and ports 19, 21 to exhaust. The pressure drop across restrictor 30 causes the piston 27 to move the crank 24 in an anti-clockwise direction until roller 26 or roller 26a engages the associated projection 22 or 23 to move the lever 10 towards its central, or neutral, position and so reduce the transmission ratio. The load on the engine is thus reduced and when the signal pressure in line 16 rises sufficiently to shut port 19 the crank 24 is moved clockwise to permit full movement of the lever 24.

In the arrangement described above, if the lever 10 is moved towards the neutral position under the influence of the crank 24, the lever 10 must be reset manually to its original position once the crank 24 has again moved clockwise. Moreover, if the apparatus operates to remove an overload condition from the engine, the overload condition may immediately be reapplied by means of the lever 10 immediately the crank 24 has moved clockwise.

Figure 3:
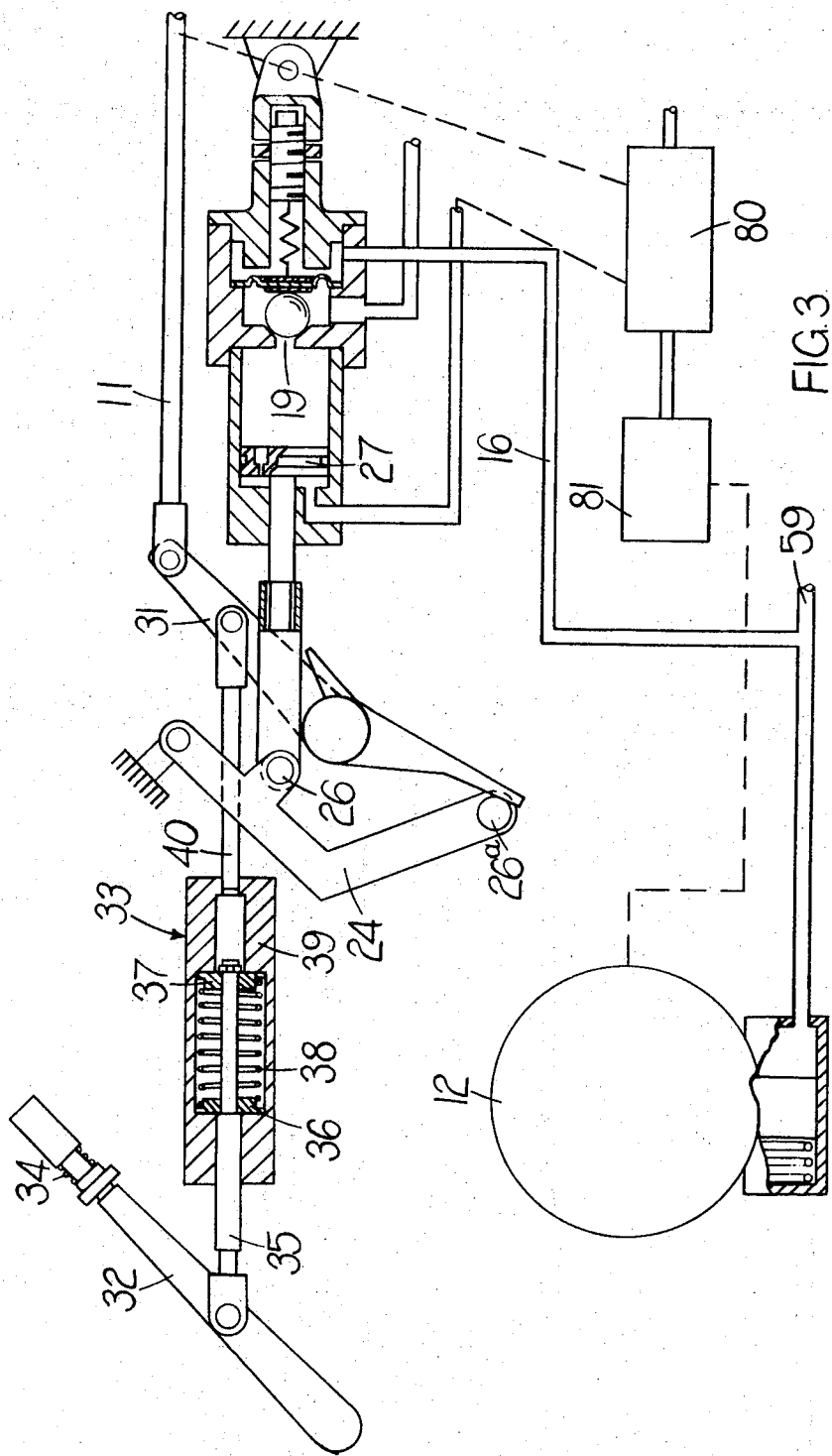

The aforementioned disadvantages are overcome in the arrangement shown in FIG. 3 in which the link 11 engages a lever 31. The lever 31 is itself movable by a further lever 32 via a spring-loaded over-ride mechanism 33. The lever 32 incorporates a friction device 34 by means of which it is retained in any position to which it is set. The over-ride mechanism 33 comprises a link 35 upon which two collars 36, 37 are slidable and are biased apart against stops on the link 35 by means of a spring 38. A sleeve member 39 surrounds the link 35 and includes internal abutments for the collars 36, 37. A link 40 connects the sleeve member 39 with the lever 31.

In use the apparatus operates substantially as previously described, the crank 24 being moved fully clockwise when the engine is running normally, and the lever 31 thus being free to follow lever 32, the stiffness of the spring 36 being sufficient to overcome the force required to move the link 11. When the port 19 is opened, the crank 24 is moved anti-clockwise by the piston 27 and moves the lever 31 towards its neutral position. Since lever 32 remains stationary the spring 38 is compressed. Movement of the piston 27 stops either when the force exerted by the spring 38 balances the force exerted by the piston 27 or when the lever 31 has moved far enough to reduce the engine load to a point where port 19 starts to close. The rate of spring 38 is therefore preferably low enough to ensure that the latter of the foregoing events occurs first. When port 19 starts to close due to reduced engine load, the force exerted by the piston falls to a point where it is balanced by the spring 38, at which point the apparatus is in equilibrium. A subsequent reduction in the external load applied via the transmission will cause the port 19 to close still further. Piston 27 moves crank 24 clockwise and lever 31 is urged by spring 38 to follow lever 32 until a new equilibrium position is reached.

We claim:

1. A control apparatus for a hydraulic transmission of the type having a fluid pump hydraulically connected to a fluid motor and in which the transmission ratio is variable by varying the ratio of the displacements of pump and motor, the pump being driven in use by an engine with which is associated a fuel control arrangement regulated by a signal pressure dependent on a throttle lever position and on the engine speed, said control apparatus comprising control means for varying the transmission ratio, an adjustable stop for limiting movement of said control means, a fuel pump forming part of said fuel control arrangement, said signal pressure being derived from said fuel pump, means sensitive to said signal pressure for providing a control signal, and an actuating means for said stop, said actuating means being responsive to said control signal, the arrangement being such that, at a predetermined value of said signal pressure, said actuating means moves said stop so as to cause said control means to reduce the transmission ratio.

2. The control apparatus according to claim 1, in which said control means includes a lever having a pair of abutments respectively engageable with said stop at opposite limits of said movement of said control means.

3. The control apparatus according to claim 2 in which said adjustable stop comprises a member having portions respectively engageable by said abutments, said member being movable by said actuating means to vary the positions of said portions with respect to the pivotal axis of said lever.

4. The control apparatus according to claim 3 in which said adjustable stop is angularly movable by said actuating means about an axis spaced from the pivotal axis of said lever.

5. The control apparatus according to claim 3 which includes a further lever linked to said lever by an override arrangement including biassing means urging said lever towards a position corresponding to the position of said further lever.

6. The control apparatus according to claim 5 in which movement of said actuating means in a direction to cause said control means to reduce the transmission ratio is opposed by biassing means.

7. The control apparatus according to claim 1 in which said actuating means comprises a pilot valve responsive to said signal pressure and a piston movable in response to a servo pressure controlled by said pilot valve.

8. The control apparatus according to claim 7 in which opening said pilot valve decreases said servo pressure to urge said actuating means to reduce the transmission ratio.

9. The control apparatus according to claim 8 in which said pilot valve includes an element responsive to said signal pressure to urge said pilot valve shut and a spring biassing said element against said signal pressure, the magnitude of said signal pressure decreasing with increasing load on the engine.

10. The control apparatus according to claim 1 in which said signal pressure controls the timing of an injector pump for fuel for the engine.

* * * * *